United States Patent [19]
Best

[11] Patent Number: 5,924,287
[45] Date of Patent: Jul. 20, 1999

[54] DOMESTIC ENERGY SUPPLY SYSTEM

[76] Inventor: Frederick George Best, 15 St. Lukes Road, Maidenhead, Berkshire SL6 7AR, United Kingdom

[21] Appl. No.: 08/614,362

[22] Filed: Mar. 12, 1996

Related U.S. Application Data

[63] Continuation-in-part of application No. 08/150,119, Dec. 16, 1993, abandoned.

[30]    Foreign Application Priority Data

May 29, 1991 [GB] United Kingdom ............... 9111523

[51] Int. Cl.$^6$ .................................................. F01K 27/00
[52] U.S. Cl. ........................... 60/643; 60/641.1; 60/641.2; 60/641.8
[58] Field of Search ............................... 60/641.1, 641.8, 60/673, 641.2, 643; 126/360 R, 360 A; 122/31.2, 509; 431/157, 158

[56]          References Cited

U.S. PATENT DOCUMENTS

| | | | |
|---|---|---|---|
| 2,173,115 | 9/1939 | Hutto | 431/157 |
| 3,070,703 | 12/1962 | Podolny | 290/2 |
| 3,826,092 | 7/1974 | Cosby | 60/643 |
| 4,087,976 | 5/1978 | Morrow, Jr. et al. | 60/643 |
| 4,161,657 | 7/1979 | Shaffer, Jr. | 290/1 R |
| 4,583,938 | 4/1986 | Fardeau et al. | 431/79 |
| 4,841,731 | 6/1989 | Tindell | 60/641.8 |
| 4,896,507 | 1/1990 | Hosford | 60/641.8 |
| 4,910,963 | 3/1990 | Vanzo | 60/641.8 |
| 5,271,378 | 12/1993 | Herold | 126/360 A |
| 5,272,879 | 12/1993 | Wiggs | 60/676 |
| 5,444,972 | 8/1995 | Moore | 60/39.182 |
| 5,518,554 | 5/1996 | Newman | 136/248 |

*Primary Examiner*—Ira S. Lazarus
*Assistant Examiner*—Ljiljana V. Ciric
*Attorney, Agent, or Firm*—Austin R. Miller

[57]          ABSTRACT

An energy supply system which utilizes a vaporizing chamber containing a vaporisable liquid. A heat source is supplied to vaporize the liquid which drives an engine to produce mechanical energy. A condenser is connected to the engine to condense the vapor back to a liquid, which is then fed back to the vaporizing chamber. The mechanical energy is used to supply usable electrical energy and to power an electrolysis plant which separates water into its constituent parts. The constituent parts are stored for subsequent energy-creating recombination in an electricity-producing fuel cell and/or a heat energy-producing underwater burner. The heat energy produced by the underwater burner is used to heat a water supply surrounding the burner.

9 Claims, 2 Drawing Sheets

DOMESTIC ENERGY SUPPLY SYSTEM

This is a continuation-in-part of application Ser. No. 08/150,119, filed Dec. 16, 1993, now abandoned.

BACKGROUND OF THE INVENTION

The present invention relates to an energy supply system, which has particular, but not exclusive, application to domestic installations.

In the context of the present invention the term alternative energy source refers to all non-fossil fuels such as wind generated energy, solar energy, energy derived from waste disposal, energy recovered from flue gases or other waste fluids, and energy derived from the decomposition of vegetable or other matter.

In one aspect, the present invention provides an energy supply system comprising a vaporizing chamber containing a vaporisable liquid to which heat from heat source is supplied to vaporize the liquid; energy-conversion means which is driven by the vaporized liquid from the vaporizing chamber so producing mechanical energy; and a condenser which condenses the vaporized liquid exiting from the energy-conversion means; and feed means which returns the resulting condensate to the vaporizing chamber, at least a portion of the produced mechanical energy being used to power an electrolysis of water to separate it into its constituent parts for subsequent energy-creating recombination.

The heat source may be in the form of an alternative energy source, as hereinbefore defined, or combinations thereof.

Preferably, the energy-conversion means may be an engine in the form of a turbine or positive displacement device.

Preferably, an electrical generator uses the mechanical energy produced by the energy-conversion means to generate electrical energy, which powers said electrolysis of water.

Preferably, the energy-creating recombination of the constituent parts of the water may be implemented using an underwater burner, whereby the energy created is in the form of heat.

Preferably, the energy-creating recombination of constituent parts of the water takes place using a fuel cell, whereby the energy created is in the form of electricity.

In another aspect the present invention provides a method for supplying energy comprising the steps of heating a vaporisable liquid; supplying the vaporized liquid to the energy-conversion means which is driven by the vaporized liquid so producing mechanical energy; using the mechanical energy to power an electrolysis of water so as to separate it into its constituent parts; and subsequently recombining the constituent parts to produce energy.

BRIEF DESCRIPTION OF THE DRAWINGS

Embodiments of the invention are hereinafter described with reference to the accompanying drawings, in which.

DETAILED DESCRIPTION OF THE INVENTION

Figure 1:
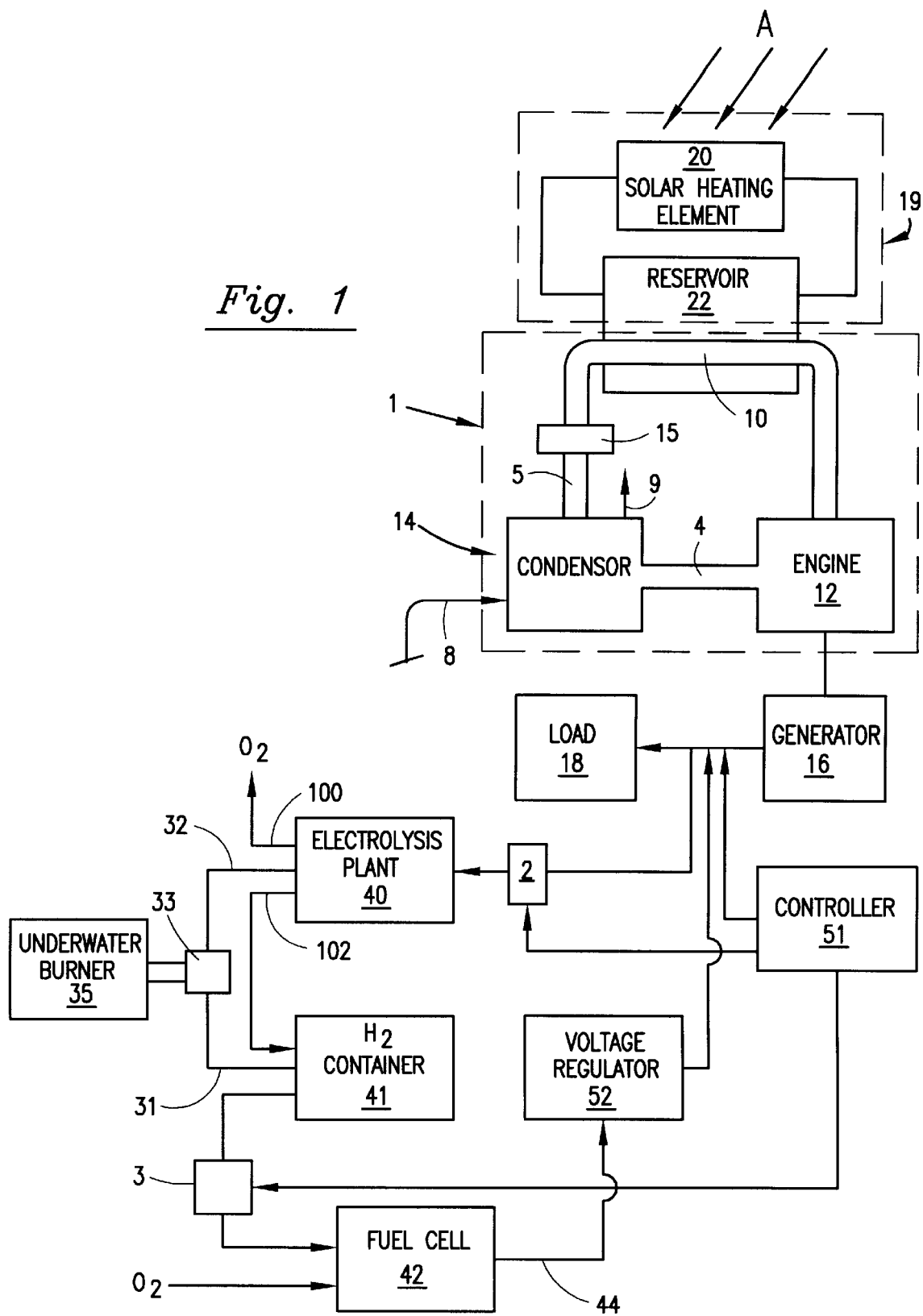
FIG. 1 represents a schematic view of an embodiment of the invention in use with a solar heating device as the heat source.

In an embodiment of the invention as illustrated in FIG. 1, the system has two closed fluid-flow circuits. A heat source is provided by a first fluid-flow circuit, a heating circuit, generally denoted 19, which comprises a reservoir 22 of liquid, in series with a solar heating element 20. The solar heating element 20 is powered by solar energy denoted A, the solar energy A serving to heat the liquid contained therein and consequentially the liquid contained in the reservoir 22.

The second circuit, the working circuit, generally denoted 1, comprises a vaporizing chamber 10, which is immersed in the reservoir 22 of the heating circuit 19, and is in series with an engine 12 and a condenser 14, the condenser 14 thus also being connected to the vaporizing chamber 10 via feed means 15. The condenser 14 is further provided with a cold water inlet 8 which is operable to feed cold water from an external source (not shown) on to the coil of the condenser 14. The cold water serves to cool the coil of the condenser 14, after which the resulting heated water exits the condenser 14 via hot water outlet 9. The engine 12 is further connected to an electrical generator 16, the output of which is operatively connected to a load 18 and an electrolysis plant 40, via relay 2. The output of the electrical generator 16 is also monitored by a controller 51, which inter alia, controls the relay 2.

The precise nature of feed means 15 selected depends on what type of engine is used. For example, if a positive displacement device is selected as the engine 12 then the feed means 15 may comprise an auxiliary piston attached to, and driven by, the engine piston. On the other hand, if a turbine is used, then an electric pump driven by the electrical generator 16 might be used. Of course, in a domestic energy supply system for use in a domestic installation, where relatively small amounts of power are generated, a small positive displacement device is significantly more energy efficient than a turbine. Currently, a turbine is not usable for the scale of application of a domestic installation.

The electrolysis plant 40, which is of conventional construction, carries out the electrolysis of water and is provided with an oxygen outlet 100 and a hydrogen outlet 102. The hydrogen outlet 102 is connected to a suitable container 41, which itself is in communication with a fuel cell 42 via a valve 3. The valve 3 is also controlled by controller 51. The fuel cell 42 is operable to provide electrical power when hydrogen gas enters the fuel cell 42 via valve 3, in manner which is widely known. The power output 44 of the fuel cell 42 is connected to an electronic voltage regulator 52 which is operable to maintain the output voltage at a predetermined level.

In use, for example, in the domestic situation, the solar energy A heats up the liquid contained in the heating circuit 19 and thus also heats the liquid in the reservoir 22. The heating of liquid in the reservoir 22 vaporizes the liquid in the vaporizing chamber 10. The resultant pressure build-up in the vaporizing chamber 10 causes high pressure vaporized liquid 3 to drive the engine 12, and hence the connected electrical generator 16. The lower pressure vapor 4 which is expelled from the engine 12 is condensed in the condenser 14 and passed as liquid 5 back into the higher pressure vaporizing chamber 10, via the feed means 15.

If the solar energy A is present in sufficient quantities, then the controller 51 establishes that the present load requirements of the household are below the power currently being produced (i.e., the voltage output of electrical generator is above a certain threshold value), in which case the excess power is channelled via relay 2 to the electrolysis plant 40, where water is then electrolyzed. The evolved hydrogen exits via outlet 102 and is stored in the hydrogen store 41.

The oxygen gas which is evolved from oxygen outlet 100 may be vented to the atmosphere. In the case when the heat source is derived not from the sun but, for example, from waste material then the oxygen may assist in the combustion thereof. Alternatively, the oxygen may simply be stored in a similar way to the hydrogen for either possible use in the fuel cell or possible sale.

If the controller 51 establishes that the solar energy source is insufficient to meet the present load requirements of the household (i.e., the output voltage of the generator falls below a predetermined threshold), the controller 51 opens the valve 3, thus allowing hydrogen to flow into the fuel cell 42. The resultant electrical power produced by the fuel cell 42 enables the voltage regulator 52 to compensate for the shortfall in the available solar energy and maintain the output power of the generator 16 in step with the household power requirements.

In another embodiment of the invention, the voltage regulator 52 may be replaced by an electric motor in series with the generator 16. In another embodiment of the invention, where the heat storage properties of the heating circuit 19 are not required, it may be omitted.

It will be appreciated by any skilled person that within the system just described, there are several heat sources which can be further exploited. For example, the cooling fluid flowing through the condenser via inlet 8 and outlet 9 may be used in numerous other to domestic contexts, for example space heating. It may also be used to heat outside areas such as patios to keep free from ice or snow.

Figure 2:
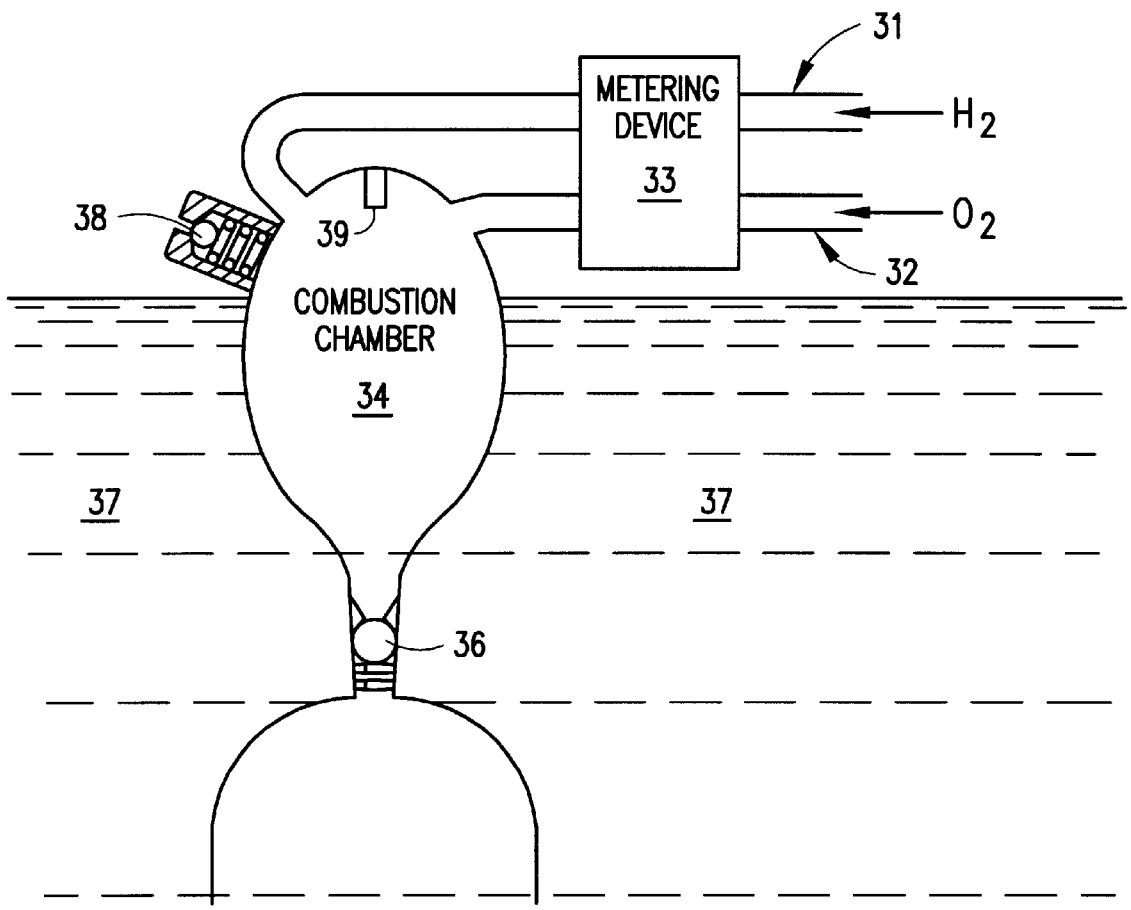
FIG. 2 shows a schematic of an underwater burner used when reacting together hydrogen and oxygen.

As an alternative to the fuel cell 42 arrangement hereinbefore described, an underwater burner 35 of the type shown in FIG. 2 may be utilized as a replacement to or in conjunction with fuel cell 42. Previously electrolyzed hydrogen and oxygen gas are supplied by pipes 31 and 32 respectively into a metering device 33, which controls the ratios of hydrogen and oxygen flowing therethrough. The correct ratios of hydrogen and oxygen are then fed into a combustion chamber 34 lined with catalyst, which is submersed in fluid water 37. The fluid may be or any other suitable fluid. The combustion chamber 34 is shaped to ensure complete combustion and mixing of the gases. The combustion chamber 34 is further provided with an igniter 39 which initiates the complete combustion of the gases, if complete combustion is not achieved spontaneously on mixing together the gases. The resultant mixture of water, water vapor and super-heated steam leaves the combustion chamber 34 by a conventional non-return valve 36.

The heat energy generated during recombination serves to heat up the surrounding fluid 37 by convection, radiation and from the gases in the combustion chamber 34. The surrounding fluid 37 can thus be a source of hot water on demand, the temperature thereof simply being controlled by the amount of hydrogen and oxygen to be re-combined. After combustion is complete a further non-return valve 38 allows air to bleed into the chamber 34 to prevent the formation of a vacuum therein. The formation of a vacuum in the chamber 34 would give rise to the risk of the combustion chamber 34 collapsing.

In another embodiment of the invention (not illustrated), where the heat source is provided by a furnace, it will be appreciated that the oxygen produced by the electrolysis plant 40 may be fed back to the furnace to aid further the operation of the furnace. In this respect, it is pointed out that hydrogen gas may similarly be used in this role, if desired or otherwise disposed of.

The electrolysis plant 40 and the fuel cell 42 may be embodied in a single unit. When the heating circuit 19 is omitted, it will be appreciated that the vaporizing chamber may be directly heated by solar or other energy.

It will thus be understood that the present invention is suitable for use in all areas where it is desired to cut down on energy bills by making use of alternative energy sources. In domestic installations, the use of the invention may well dispense substantially with the need for conventional gas and electricity services. It will be appreciated that distilled water will also be a product of the energy-creating recombination of the hydrogen and oxygen, thereby providing a source of potable water which could dispense with the need for a basic potable supply to the dwelling. Furthermore, it will be seen that there are no pollutants generated by the system of the present invention, whereby the system is environmentally friendly.

What is claimed is:

1. A domestic energy supply system comprising:

a vaporizing chamber containing a vaporisable fluid;

a heat source capable of supplying heat to turn said vaporisable fluid from a liquid to a vapor, said heat source comprising an energy source selected from one or more of the group consisting of a wind generated energy source, a solar energy source, a flue gas energy source, and a source in which energy is derived from the decomposition of organic matter;

an energy-conversion means connected to said vaporizing chamber which is driven by said vapor to produce mechanical energy;

a condenser for cooling said vapor and condensing said vapor back to liquid, said condenser being connected to said energy conversion means;

feed means connected to said condenser which returns said liquid to said vaporizing chamber;

water in electrical contact with means for producing electrolysis of water to separate said water into its constituent parts connected to said energy-conversion means and powered by at least a portion of said mechanical energy; and means for producing a recombination of the constituent parts of said water to produce energy, connected to said means for producing electrolysis, comprising a fuel cell to produce electrical energy, and an underwater burner for producing heat energy to heat a domestic water supply surrounding said underwater burner.

2. A domestic energy supply system comprising:

a vaporizing chamber containing a vaporisable fluid;

a heat source capable of supplying heat to turn said vaporisable fluid from a liquid to a vapor, said heat source comprising an energy source selected from one or more of the group consisting of a wind generated energy source, a solar energy source, a flue gas energy source, and a source in which energy is derived from the decomposition of organic matter;

a positive displacement device connected to said vaporizing chamber which is driven by said vapor to produce mechanical energy;

a condenser for cooling said vapor and condensing said vapor back to liquid, said condenser being connected to said a positive displacement device;

feed means connected to said condenser which returns said liquid to said vaporizing chamber;

water in electrical contact with means for producing electrolysis of water to separate said water into its constituent parts connected to said positive displacement device and powered by at least a portion of said mechanical energy; and means for producing a recombination of the constituent parts of said water to produce energy, connected to said means for producing electrolysis, comprising a fuel cell to produce electrical energy, and an underwater burner for producing heat energy to heat a domestic water supply surrounding said underwater burner.

3. A domestic energy supply system comprising:

a vaporizing chamber containing vaporisable fluid;

a heat source capable of supplying heat to turn said vaporisable fluid from a liquid to a vapor, said heat source comprising an energy source selected from one or more of the group consisting of a wind generated energy source, a solar energy source, a flue gas energy source, and a source in which energy is derived from the decomposition of organic matter;

energy-conversion means connected to said vaporizing chamber which is driven by said vapor to produce mechanical energy;

a condenser for cooling said vapor and condensing said vapor back to liquid, said condenser being connected to said energy conversion means;

feed means connected to said condenser which returns said liquid to said vaporizing chamber;

water in electrical contact with means for producing electrolysis of water to separate said water into its constituent parts connected lo said energy-conversion means and powered by at least a portion of said mechanical energy; and an underwater burner. connected to said means for producing electrolysis, for producing a recombination of the constituent parts of said water for producing heat energy to heat a domestic water supply surrounding said underwater burner.

4. A domestic energy supply system according to claim 1 or 3, wherein said energy-conversion means is a positive displacement device.

5. A domestic energy supply system according to claim 2, wherein said means for producing electrolysis of water is connected to said positive displacement device via an electrical generator which uses said mechanical energy produced by said positive displacement device to generate output electrical power to said means for producing electrolysis of water.

6. A domestic energy supply system according to claim 5, further comprising a regulation means, operable to monitor said output electrical power from said electrical generator, said regulation means being adapted to control the energy-creating recombination of the constituent parts of said water and initiate operation of said electrolysis means in response to variations in said output electrical power.

7. A domestic energy supply system according to claims 1 or 3, wherein said means for producing electrolysis of water is contacted to said energy-conversion means via an electrical generator which uses said mechanical energy produced by said energy-conversion means to generate output electrical power to said means for producing electrolysis of water.

8. A domestic energy supply system according to claim 7, further comprising a regulation means, operable to monitor said output electrical power from said electrical generator, said regulation means being adapted to control the energy-creating recombination of the constituent parts of said water and initiate operation of said electrolysis means in response to variations in said output electrical power.

9. A domestic energy supply system according to claims 1, 2, or 3, further comprising an inlet to said condenser for supplying cooling fluid to said condenser and an outlet from said condenser for removing cooling fluid.

\* \* \* \* \*